(12) United States Patent
Koufos et al.

(10) Patent No.: US 12,485,426 B2
(45) Date of Patent: Dec. 2, 2025

(54) AUTOMATED DATA DESTRUCTION SYSTEM AND METHOD OF USE

(71) Applicants: Michael Koufos, Jacksonville, FL (US); Simon Levin, Jacksonville, FL (US)

(72) Inventors: Michael Koufos, Jacksonville, FL (US); Simon Levin, Jacksonville, FL (US)

(*) Notice: Subject to any disclaimer, the term of this patent is extended or adjusted under 35 U.S.C. 154(b) by 52 days.

(21) Appl. No.: 18/807,885

(22) Filed: Aug. 16, 2024

(65) Prior Publication Data
US 2025/0058382 A1 Feb. 20, 2025

Related U.S. Application Data

(60) Provisional application No. 63/533,124, filed on Aug. 16, 2023.

(51) Int. Cl.
*B02C 25/00* (2006.01)
*B02C 18/00* (2006.01)
*B23Q 3/00* (2006.01)

(52) U.S. Cl.
CPC ............. *B02C 25/00* (2013.01); *B02C 18/00* (2013.01); *B23Q 3/002* (2013.01); *Y10T 408/21* (2015.01); *Y10T 408/91* (2015.01)

(58) Field of Classification Search
CPC ............... Y10T 408/21; Y10T 408/91; Y10T 409/307728; Y10T 409/908288; B02C 18/00; B02C 25/00; B23Q 3/002
USPC ............ 408/16, 234; 409/202, 212; 269/104
See application file for complete search history.

(56) References Cited

U.S. PATENT DOCUMENTS

| | | | | |
|---|---|---|---|---|
| 3,704,879 A | * | 12/1972 | Nishikawa | B25B 1/18 269/224 |
| 5,538,372 A | * | 7/1996 | Cuneo | G05B 19/408 409/80 |
| 6,217,265 B1 | * | 4/2001 | Katayama | B23Q 1/015 409/134 |
| 6,634,838 B2 | * | 10/2003 | Kitamura | B23Q 5/385 74/29 |
| 9,959,889 B2 | | 5/2018 | Clark | |
| 10,331,876 B2 | | 6/2019 | Helsel et al. | |
| 10,556,240 B2 | | 2/2020 | Clark | |

(Continued)

FOREIGN PATENT DOCUMENTS

| | | | | |
|---|---|---|---|---|
| EP | 2937753 A1 | * | 10/2015 | ........... G05B 19/401 |
| JP | 60255348 A | * | 12/1985 | |

(Continued)

*Primary Examiner* — Sunil K Singh
*Assistant Examiner* — Michael Vitale
(74) *Attorney, Agent, or Firm* — Lippes Mathias LLP; Mitchell Ghaneie; Josephine Chen

(57) ABSTRACT

The present invention provides an automated data destruction system to remove data effectively and reliably from a mobile communication device. The system comprises a platform, a securement mechanism, a positioning mechanism, a power drill, a vision recognition system, and a controlling system. The vision recognition system and the processor identify the mobile communication device, and the controlling system controls the securement mechanism, the positioning mechanism, and the power drill to a corresponding location based on the identified mobile communication device and activates the power drill to penetrate the mobile communication device at an exact depth to restrict the damage to the flash memory chip.

8 Claims, 17 Drawing Sheets

(56) References Cited

U.S. PATENT DOCUMENTS

| | | |
|---|---|---|
| 10,572,775 B2 | 2/2020 | Greenberg |
| 10,592,657 B2 | 3/2020 | Helsel et al. |
| 11,042,783 B2 | 6/2021 | Greenberg |
| 11,107,495 B2 | 8/2021 | Clark |
| 11,167,384 B2 | 11/2021 | Clark |
| 2001/0033781 A1* | 10/2001 | Wills ........................ B23C 3/35 |
| | | 269/142 |
| 2004/0090126 A1* | 5/2004 | Hsu ........................ H02K 41/03 |
| | | 310/12.13 |
| 2009/0158574 A1* | 6/2009 | Fawzi ................... B23P 19/069 |
| | | 29/700 |
| 2009/0288532 A1* | 11/2009 | Hashish .................... B24C 5/02 |
| | | 83/53 |
| 2010/0294865 A1 | 11/2010 | Wozny |
| 2016/0151890 A1* | 6/2016 | Song ........................ B25B 11/00 |
| | | 269/104 |

FOREIGN PATENT DOCUMENTS

| | | | | |
|---|---|---|---|---|
| JP | 2004071057 A | * | 3/2004 | ........... G11B 23/505 |
| JP | 2004158172 A | * | 6/2004 | ........... G11B 23/505 |
| KR | 20100090458 A | * | 8/2010 | ........... B23Q 17/249 |
| KR | 102105266 B1 | | 4/2020 | |

* cited by examiner

AUTOMATED DATA DESTRUCTION SYSTEM AND METHOD OF USE

CROSS-REFERENCE TO RELATED APPLICATION

This application claims the benefit of U.S. Provisional Application No. 63/533,124, filed Aug. 16, 2023, and is hereby incorporated by reference in its entirety for all purposes.

FIELD OF THE INVENTION

The present disclosure relates to a system and method for destructing data from a mobile personal communication device automatically.

BACKGROUND OF THE INVENTION

Due to rapid technological advancement, people and organizations depend more on mobile communication devices, such as smartphones, tablets and laptops for storing photos, documents, contacts, and other personal information. Due to rapid technological advancement, people and organizations depend more on mobile communication devices, such as smartphones, tablets and laptops for storing photos, documents, contacts, and other personal information. Therefore, adequate data destruction is critical after the mobile communication device is being disposed, to prevent unauthorized users from accessing the data of the prior user.

Conventionally, data destruction is done by removing the battery and throwing the whole device into a shredder or removing a motherboard and throwing that motherboard into a shredder. However, it is time-consuming and laborious. Moreover, adequate destruction of the chip storing the data of the prior user is not guaranteed.

Consequently, a reliable, efficient, and cost-effective system and method to reduce labor, adequately remove prior user's data, and include components for safety purposes is needed.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention or the boundaries of its scope. Its sole purpose is to provide a rudimentary understanding of the invention's concept and features, which will be expounded upon in greater detail in the ensuing sections.

An exemplary, nonlimiting embodiment of the present invention provides an automated data destruction system and method used to remove data reliably and efficiently from a mobile communication device, such as a cellphone, a tablet, a laptop, or a smart watch. The automated data destruction system comprises a platform, a securement mechanism, a positioning mechanism, a drill, a vision recognition system, and a controlling system.

The platform has a first end, a second end opposite from the first end, a front end and a rear end opposite from the front end. The securement mechanism provides a first track disposed on the platform aligned longitudinally in the direction of an X-axis and a second track coupled to the first track on the platform and aligned longitudinally in the direction of a Y-axis perpendicular to the X-axis. The first track, the second track, and the platform define a space configured to retain a mobile communication device.

The positioning mechanism includes a first rail disposed along the first end of the platform and a second rail disposed along the second end of the platform opposite from the first end. A beam is positioned aligned longitudinally in the direction of the Y-axis, mounted across the first rail and the second rail, and configured to move in the direction of the X-axis. A tower is mounted on the beam and configured to move along the beam in the direction of the Y-axis. The tower includes at least one guide bar disposed on a surface facing the front end of the platform and is aligned longitudinally in the direction of a Z-axis orthogonal to the X-axis and the Y-axis. A movable carriage is equipped on the guide bar and configured to move along the guide bar. The positioning mechanism locates the drill to a pre-determined position, such that the drill can accurately destroy a flash memory chip of the mobile communication devices, restrict the damage to the flash memory chip without destroying the display screen or a plurality of other internal components. Therefore, the undestroyed components may be reused.

In one aspect, the securement mechanism further comprises a movable first clamp mounted on the first track configured to move along the first track and a movable second clamp mounted on the second track configured to move along the second track. The distance between the first track and the second clamp, the distance between the second track and the first clamp and a top surface of the platform form a securement space configured to secure the mobile communication device. With the movable first clamp and second clamp, the securement mechanism can be adjusted to secure different models of mobile communication devices from various manufacturers.

The vision recognition system comprises a camera and is in communication with a processor to identify the mobile communication device to identify and capture images of the mobile communication device by the height, length, width, and shape of the mobile communication device, and in addition, the location, shape, size and dimensions of at least one camera or flash of the mobile communication device to determine the specific model of the mobile communication device.

The controlling system comprises at least one controller. The vision recognition system is in communication with the processor to identify the mobile communication devices. The processor determines and controls the securement mechanism, the positioning mechanism, and the power drill to a corresponding pre-determined location based on the identified mobile communication devices.

Preferably, an automated fire suppression system including a heat sensitive member, a propellant housing receiving propellants, and a plurality of fire extinguishing nozzles is added to the automated data destruction system in case of a potential fire. When the temperature reaches a threshold of the heat sensitive member, the automated fire suppression system will be initiated.

The above features and advantages will become apparent from the following detailed description taken with the accompanying drawings.

NUMBER REFERENCES

10—Mobile Communication Device
100—Automated Data Destruction System
110—Platform
120—Securement Mechanism
121—First Track
122—First Clamp
123—First Limit Switch
124—First Motor
125—Second Track
126—Second Clamp
127—Second Limit Switch
128—Second Motor
130—Positioning Mechanism
131—First Rail
132—Second Rail
133—Beam
134—Third Motors
135—Tower
136—Guide bar
137—Carriage
138—Fourth Motor
140—Drill
142—Fifth Motor
144—Drill Press
146—Drill Bit
150—Vision Recognition System
160—Controlling System
161—Controller
162—Power Supply Unit
170—User Interface
180—Fire Suppression System
181—Heat Sensitive Member
182—Propellant Housing
183—Fire Extinguishing Nozzles
200—Second embodiment Automated Data Destruction System
210—Housing
212—Tilt-up Door
214—Handles
220—Securement Mechanism
221—First Track
222—Second Track
223—Slip Resistant Pad
230—Positioning Mechanism
231—First Rail
232—Second Rail
233—Beam
234—First Motor
235—Tower
236—Guide Bar
237—Carriage
240—Drill
242—Vacuum Hose
250—Vision Recognition System
252—Emergency Button
254—Cooling fan
260—Fire Suppression System
270—Calibration Tools

DETAILED DESCRIPTION OF THE INVENTION

The following detailed description and accompanying drawings provide a comprehensive disclosure of an exemplary embodiment for the purpose of facilitating one of ordinary skill in the relevant art to make and use the invention. As such, the detailed description and illustration of the one or more exemplary embodiments presented herein are purely exemplary in nature and are not intended to limit the scope of the invention or its protection in any matter. It is further noted that the drawings may not be to scale, and in some cases, certain details may be omitted which are not necessary for an understanding of the present invention, such as conventional details of fabrication and assembly.

Figure 1:
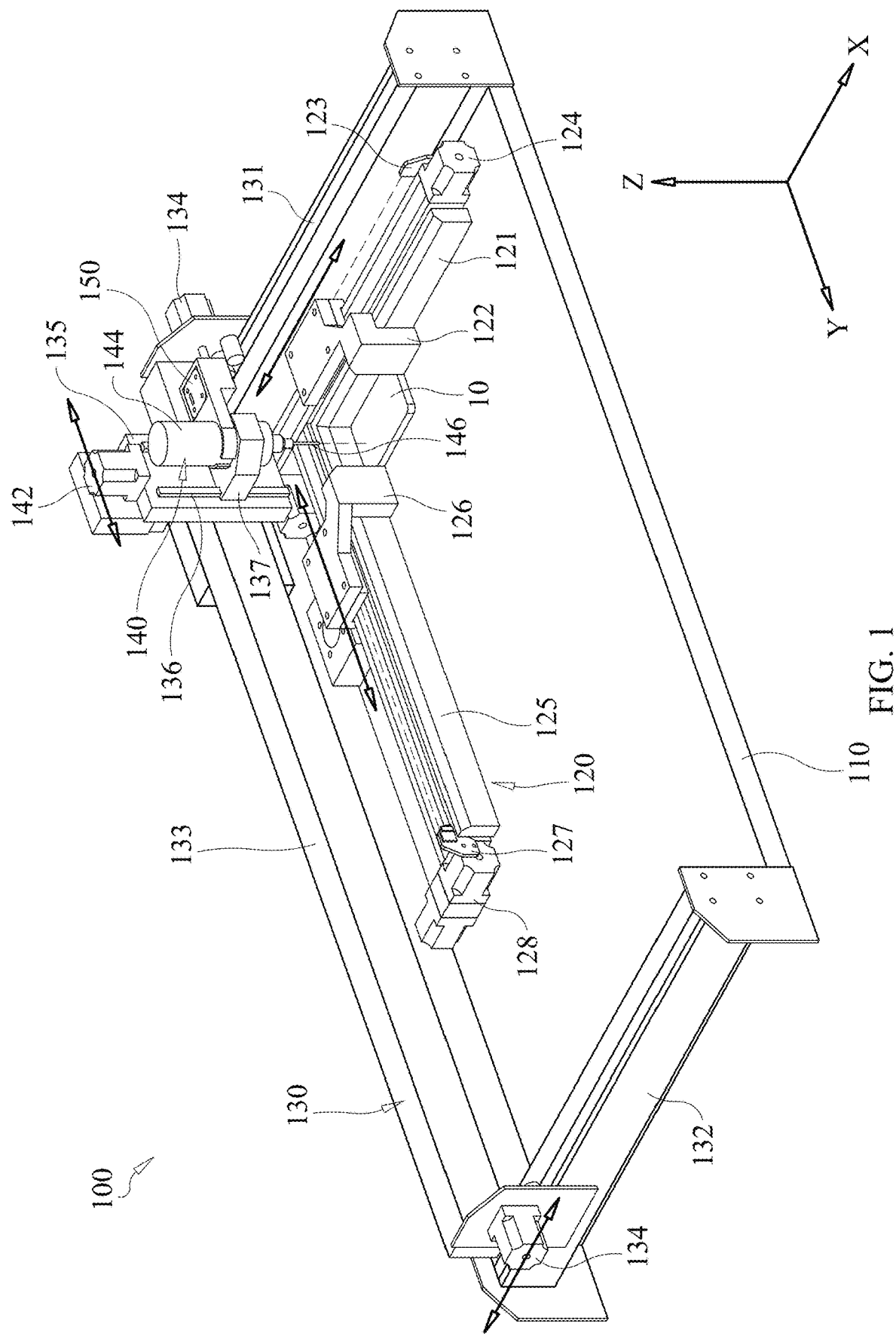
FIG. 1 is a front, left, top perspective view of an exemplary embodiment of an automated data destruction system.

For purposes of description herein, the terms "top", "bottom", "lateral", "rear", "front", and derivatives thereof shall relate to the device as oriented in FIG. 1. Furthermore, there is no intention to be bound by any expressed or implied theory presented in the preceding technical field, background, brief summary or the following detailed description.

A non-limiting exemplary embodiment (hereinafter as "the exemplary embodiment") of an automated data destruction system 100 is disclosed herein. The automated data destruction system 100 is used to remove data reliably, efficiently, cost-effectively and safely from a mobile communication device 10 including but not limited to a cellphone, a tablet, a laptop and a smart watch.

Figure 2:
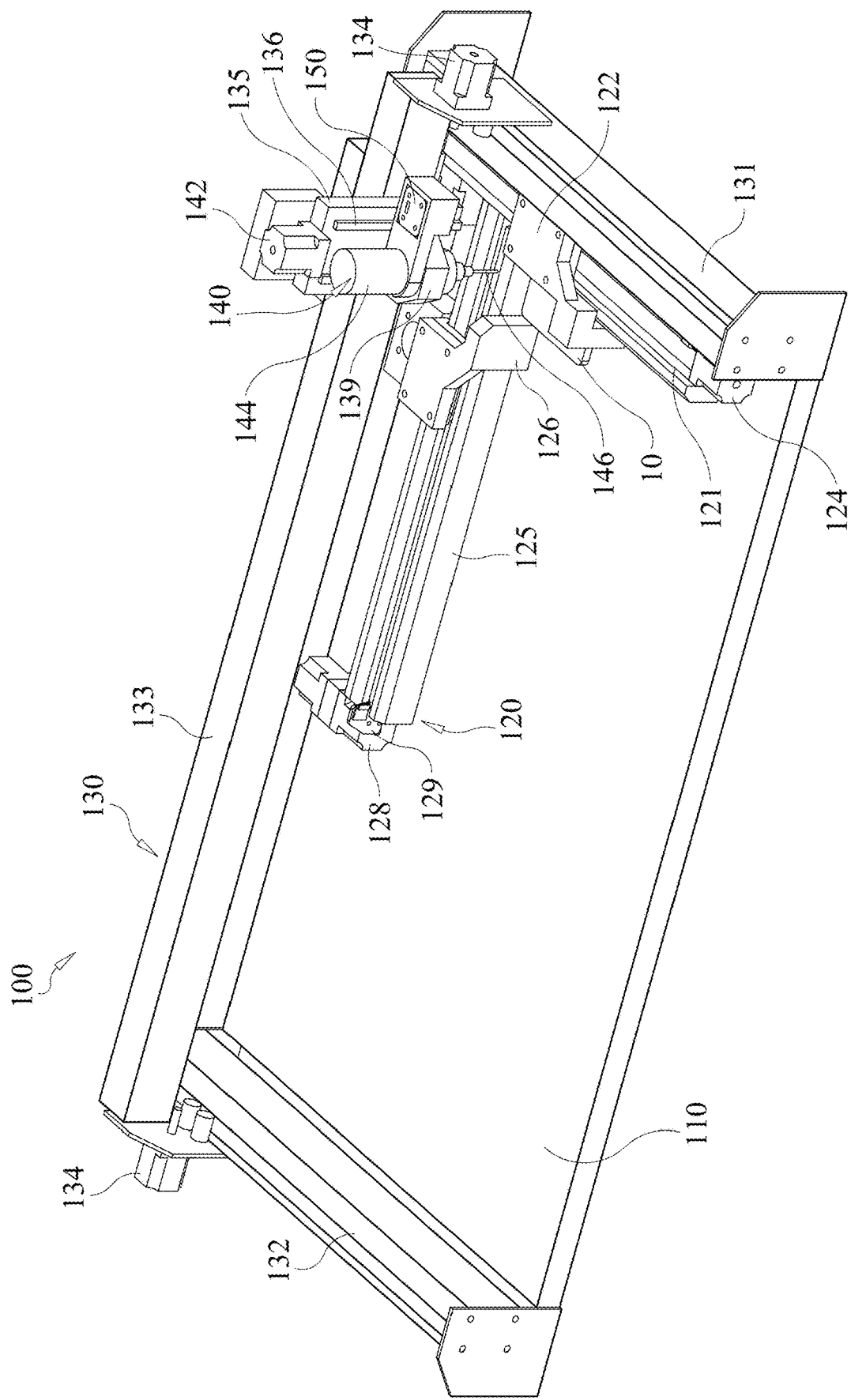
FIG. 2 is a front, right, top perspective view of the exemplary embodiment of the automated data destruction system.
Figure 3:
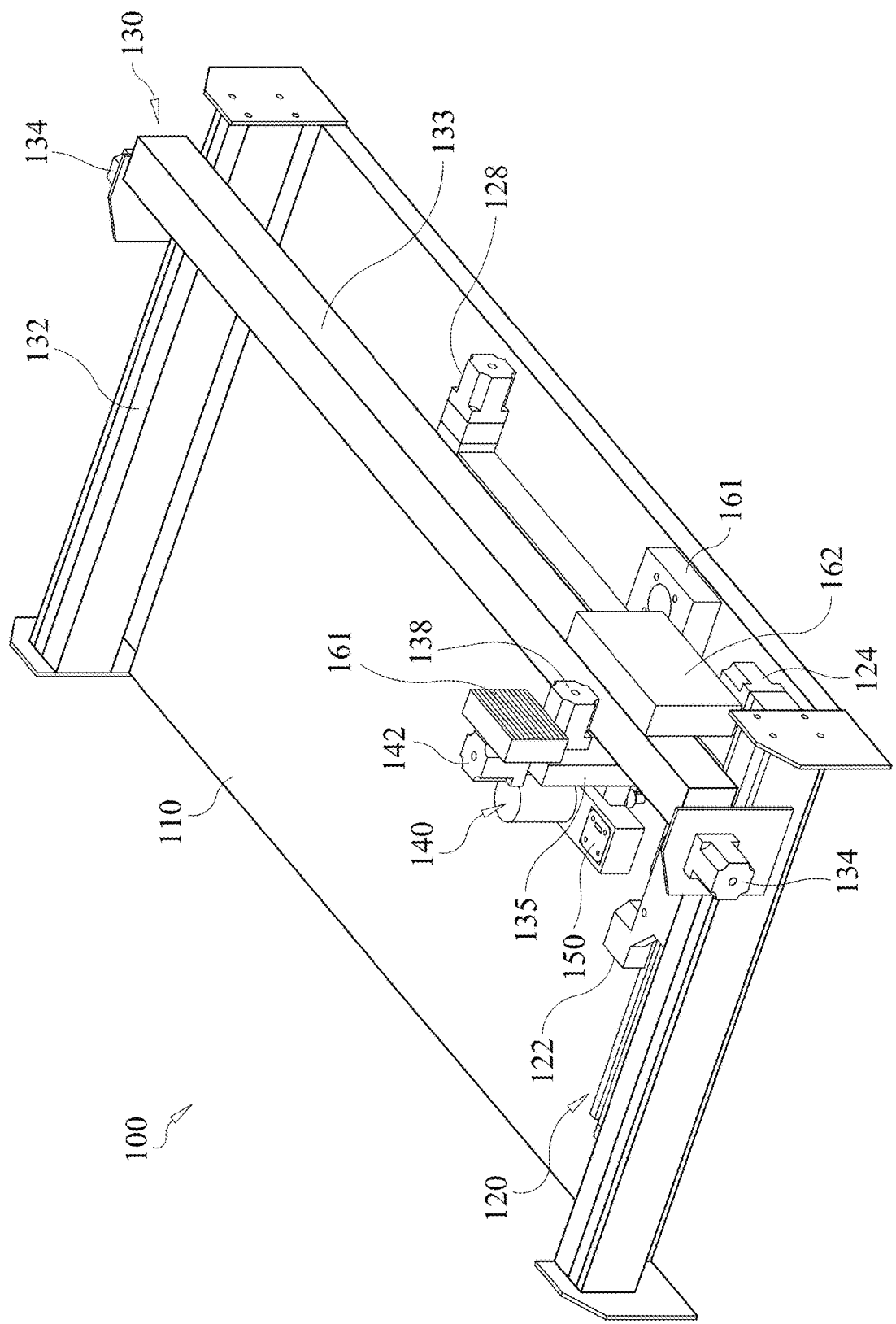
FIG. 3 is a rear, right, top perspective view of the exemplary embodiment of the automated data destruction system.
Figure 13:
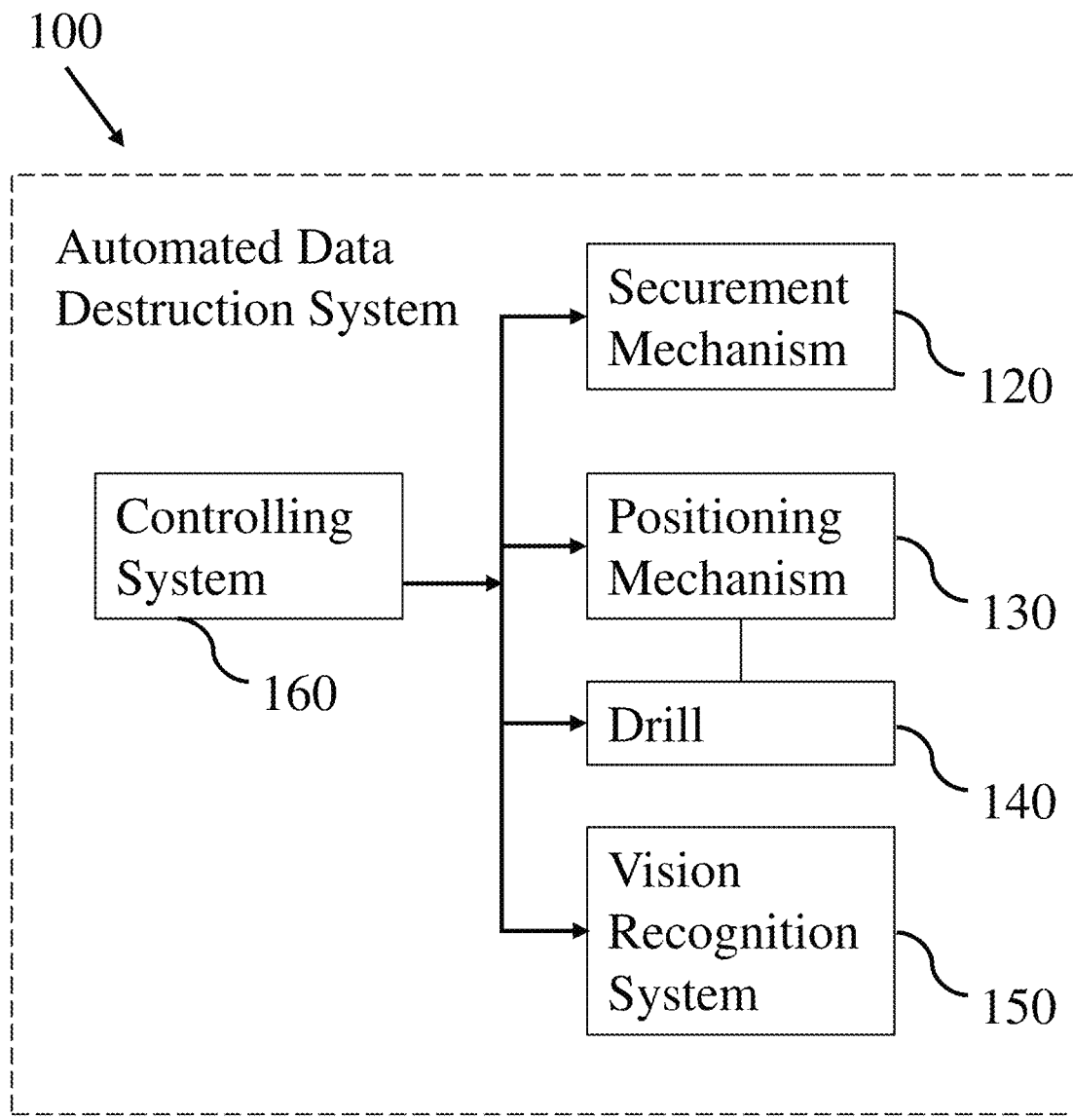
FIG. 13 is a block diagram of the exemplary embodiment of the automated data destruction system.

Referring initially to FIGS. 1 to 3 in conjunction with FIG. 13, the automated data destruction system 100 comprises a platform 110, a securement mechanism 120, a positioning mechanism 130, a drill 140, a vision recognition system 150 and a controlling system 160. The securement mechanism 120 may retain different models of mobile communication devices 10 from distinct manufacturers. The positioning mechanism 130 locates the drill 140 to a predetermined position, such that the drill 140 can accurately destroy a flash memory chip of the mobile communication device 10. The vision recognition system 150 comprises a camera to identify the mobile communication device 10, and the controlling system 160 controls the securement mechanism 120, the positioning mechanism 130, and the drill 140, based on the identified mobile communication device 10. The automated data destruction system 100 is communicated with and supplied by the power unit 16 (see FIG. 3).

The platform 110 has a first end, a second end opposite from the first end, a front end, and a rear end opposite from the front end. The platform 110 can serve as a clean background for the vision recognition system 150.

The securement mechanism 120 provides a first track 121 disposed on the platform 110 and aligned longitudinally in the direction of an X-axis, and a second track 125 coupled to the first track 121 on the platform 110 and aligned longitudinally in the direction of a Y-axis perpendicular to the X-axis. The first track 121, the second track 125 and the platform 110 defines a space configured to retain the mobile communication device 100.

In the exemplary embodiment, the securement mechanism 120 may be adjusted to accommodate the communication device 10, and further comprise a movable first clamp 122 mounted on the first track 121 and a movable second clamp 126 mounted on the second track 125. The first clamp 122 is configured to move along the first track 121, and the second clamp 126 is configured to move along the second track 125. Further, a first and a second limit switch 123, 127 are coupled to the first and second tracks 121, 125 respectively, to ensure accurate position of the first and second clamps 122, 126. It is anticipated that alternative mechanisms, such as sensors, may also be used to measure the distance and ensure accurate position of the first and second clamp 122, 126 without departing from the spirit of the invention. The securement mechanism 120 may be motorized and controlled by the controlling system 160. A first and second motor 124, 128 communicating with the first and second tracks 121, 125 respectively, drives the first and second clamps 122, 126 to move to a first and a second edge of the mobile communication device 10. The distance between the first track 121 and the second clamp 126, the distance between the second track 125 and the first clamp 122 and a top surface of the platform 110 form a securement space configured to secure the mobile communication device 10.

Turning to the positioning mechanism 130, the positioning mechanism 130 comprises a first rail 131 and a second rail 132 longitudinally disposed in the direction of the X-axis. The first rail 131 is disposed along the first end of the platform 110, and the second rail 132 is disposed along the second end of the platform 110 parallel to the first rail 131. A beam 133 having a first edge and a second edge is aligned longitudinally in the direction of the Y-axis. The first edge of the beam 133 is mounted on the first rail 131 and the second edge of the beam 133 is mounted on the second rail 132. One of each of a pair of third motors 134 is coupled to the first and second edges of the beam 133. Each of the first track 131 and the second track 132 communicates with one of the third motor 134, thereby driving the beam 133 to move along the first track 131 and the second track 132 in the direction of the X-axis. Further, a tower 135 is mounted on the beam 133 and communicated with a fourth motor 138, which enables movement of the tower 135 along the beam 133 in direction of the Y-axis. The tower 135 provides at least one guide bar 136 disposed on a surface facing the front end of the platform 110 and is positioned in the direction of a Z-axis orthogonal to the X-axis and the Y-axis. A carriage 137 is equipped on the guide bar 136 and configured to move along the guide bar 136. A fifth motor 142 is coupled to the guide bars 136 and drives the carriage 137 along the guide bar 136 in direction of the Z-axis.

As for the drill 140, the drill 140 is coupled to the carriage 137, such that the drill 140 moves along with the carriage 137 in the direction of the Z-axis. The drill 140 may further include a drill press 144 and a drill bit 146. After the drill 140 is activated, the drill bit 146 is used to precisely and accurately penetrate the mobile communication device 10, such that the integrated flash memory chip is destroyed without substantially damaging the display screen or a plurality of other internal components provided by the mobile communication device 10. The other internal components can be reused.

The vision recognition system 150 comprising a camera (within the shown housing, not visible in the drawings) used to capture images of the mobile communication device 10. The vision recognition system 150 is in communication with a processor to identify the mobile communication device 10 by measurements of the height, length, width, and shape of the mobile communication device 10, and may distinguish other details, such as the location, shape, size and dimensions of at least one camera or flash of the mobile communication device 10 to determine the specific model of the mobile communication device 10.

Figure 4:
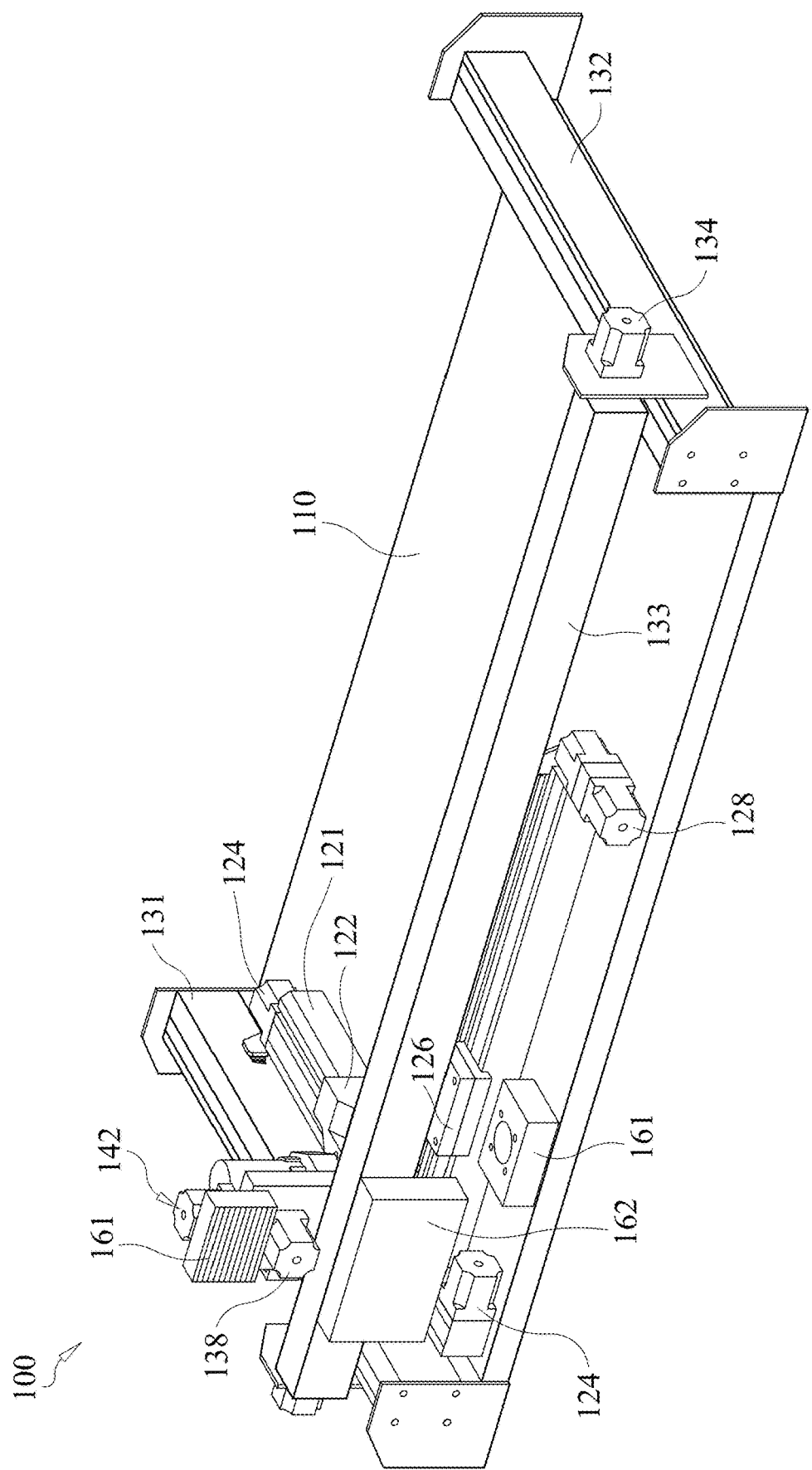
FIG. 4 is a rear, left, top perspective view of the exemplary embodiment of the automated data destruction system.
Figure 5:
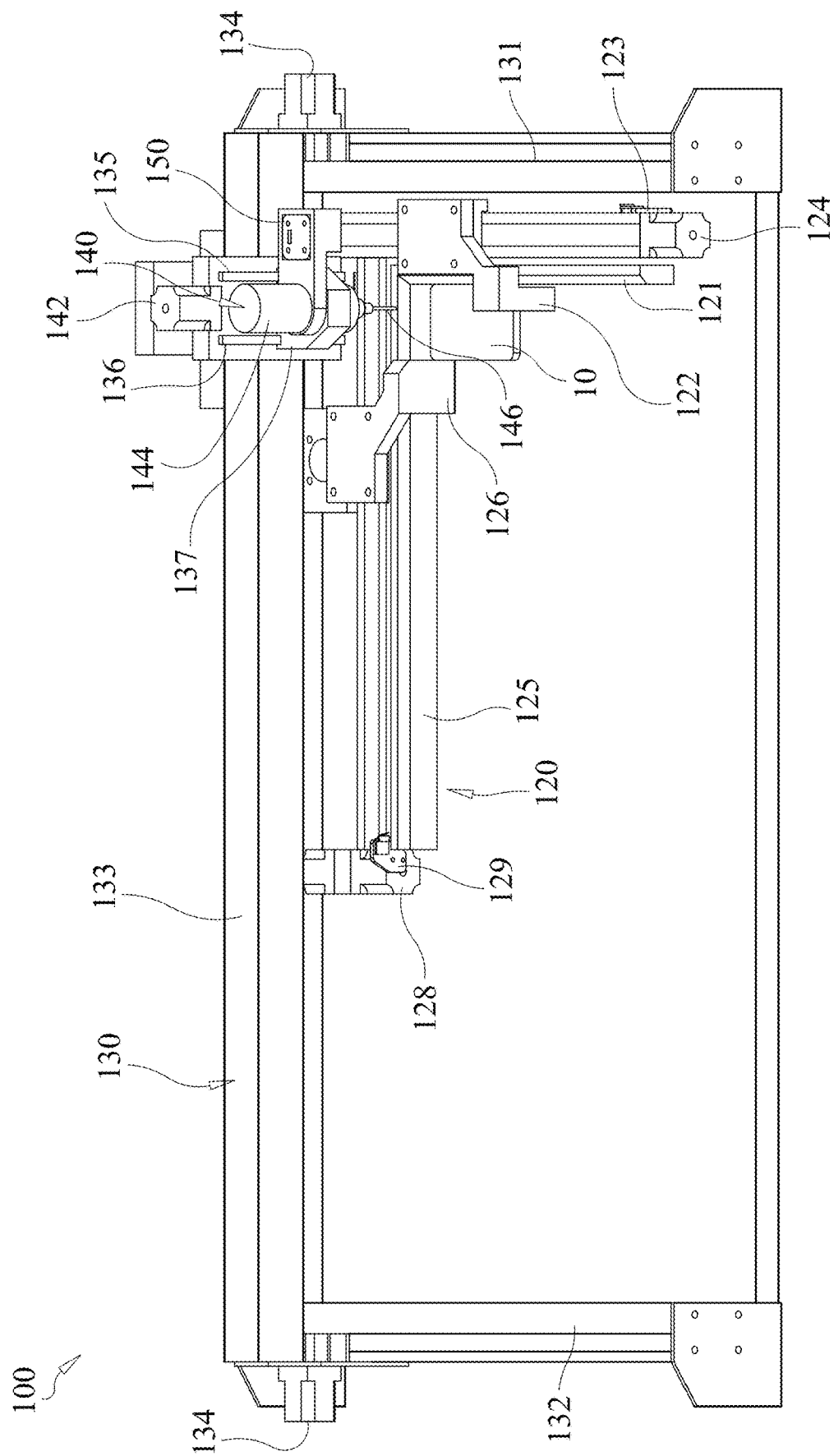
FIG. 5 is a top perspective view of the exemplary embodiment of the automated data destruction system.
Figure 6:
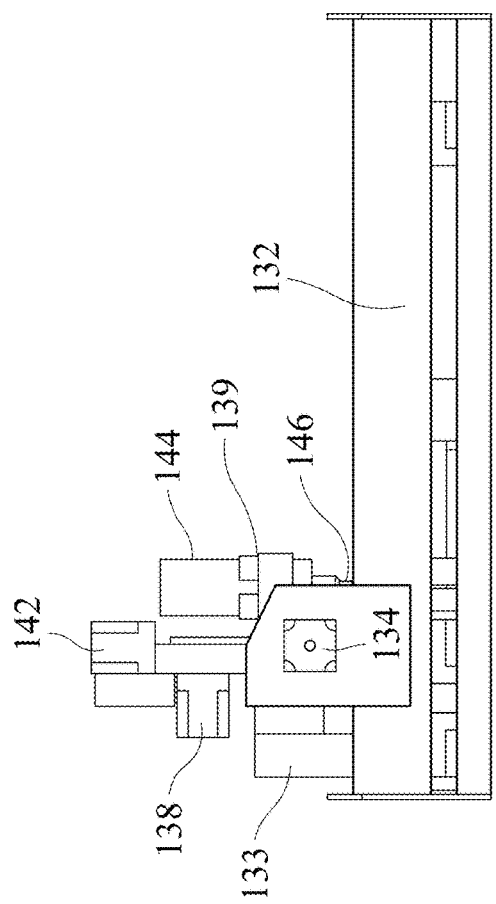
FIG. 6 is a left view of the exemplary embodiment of the automated data destruction system.
Figure 7:
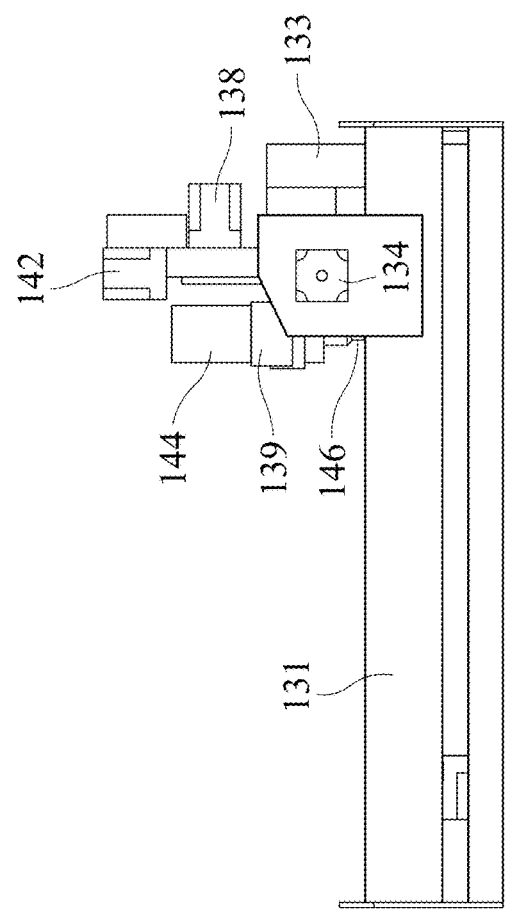
FIG. 7 is a right view of the exemplary embodiment of the automated data destruction system.
Figure 8:
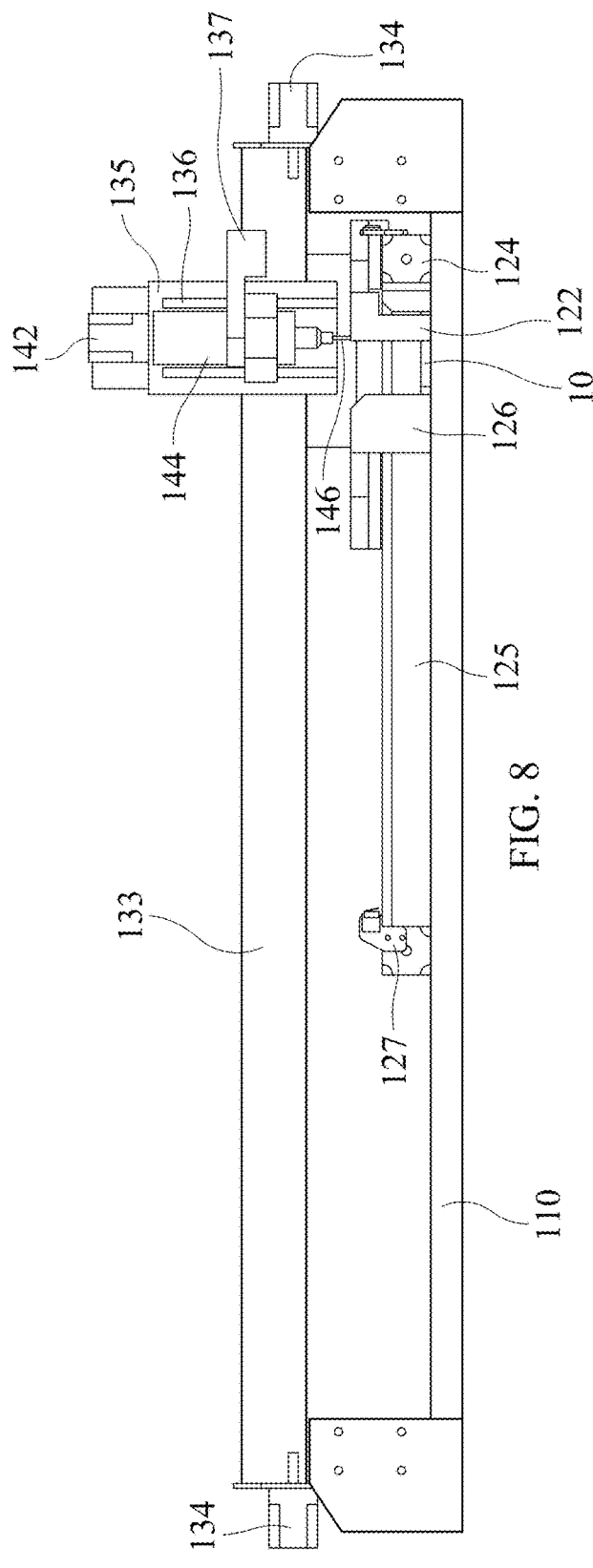
FIG. 8 is a front view of the exemplary embodiment of the automated data destruction system.
Figure 9:
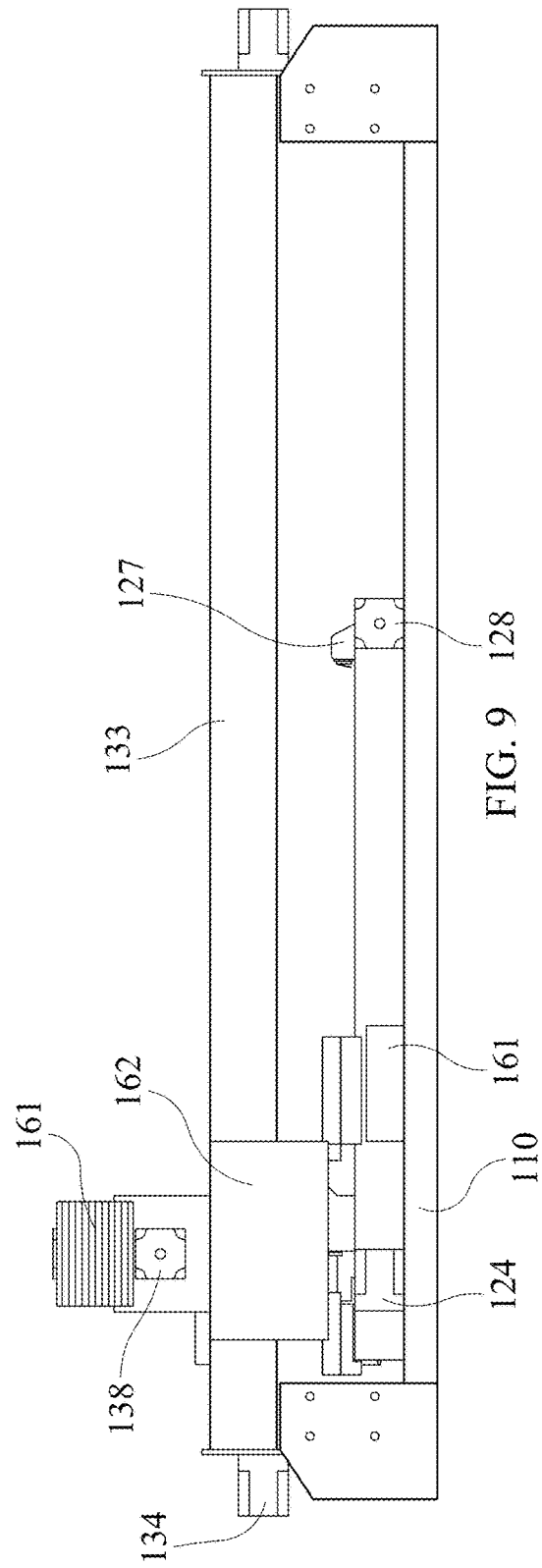
FIG. 9 is a rear view of the exemplary embodiment of the automated data destruction system.
Figure 10:
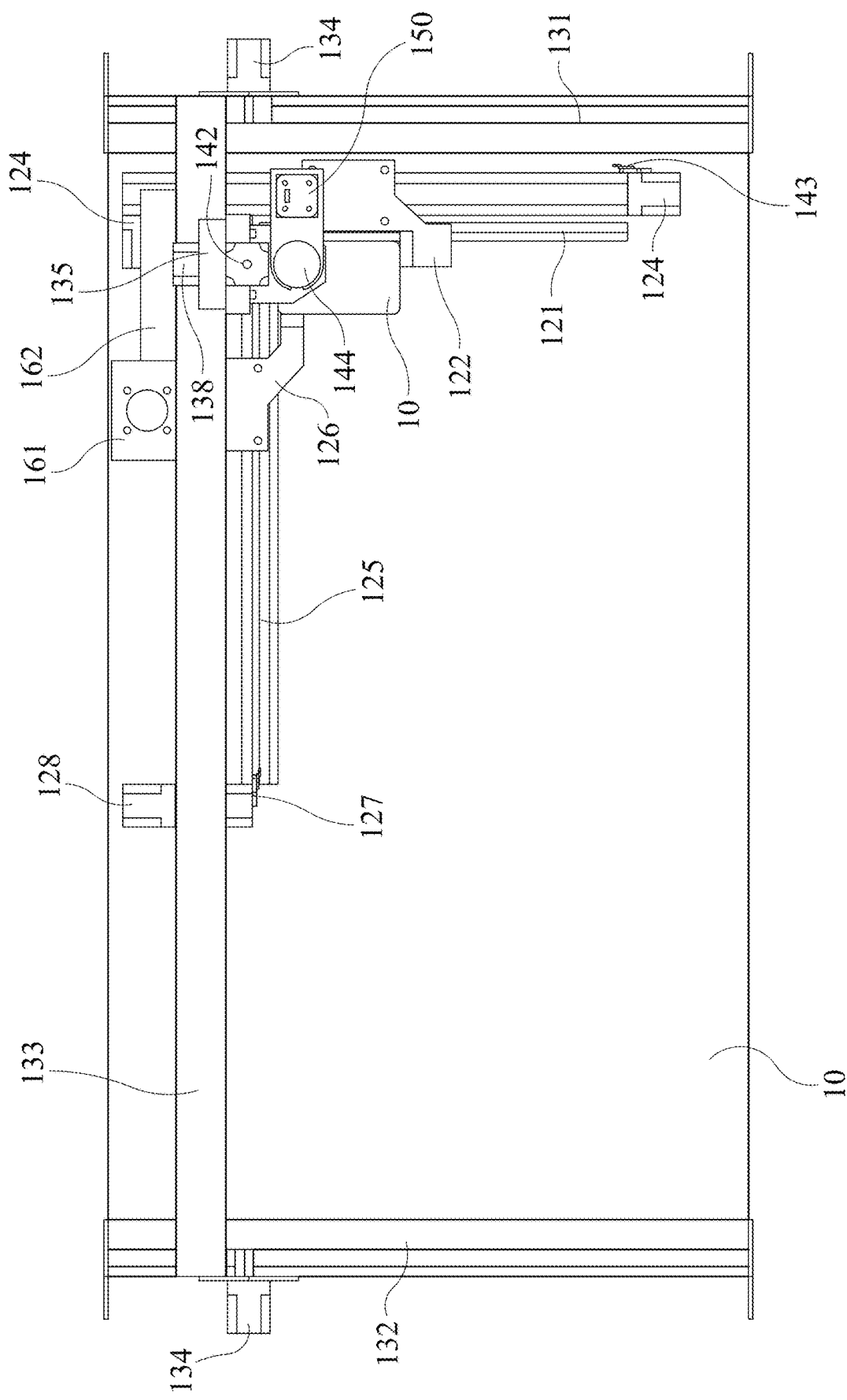
FIG. 10 is a top view of the exemplary embodiment of the automated data destruction system.
Figure 11:
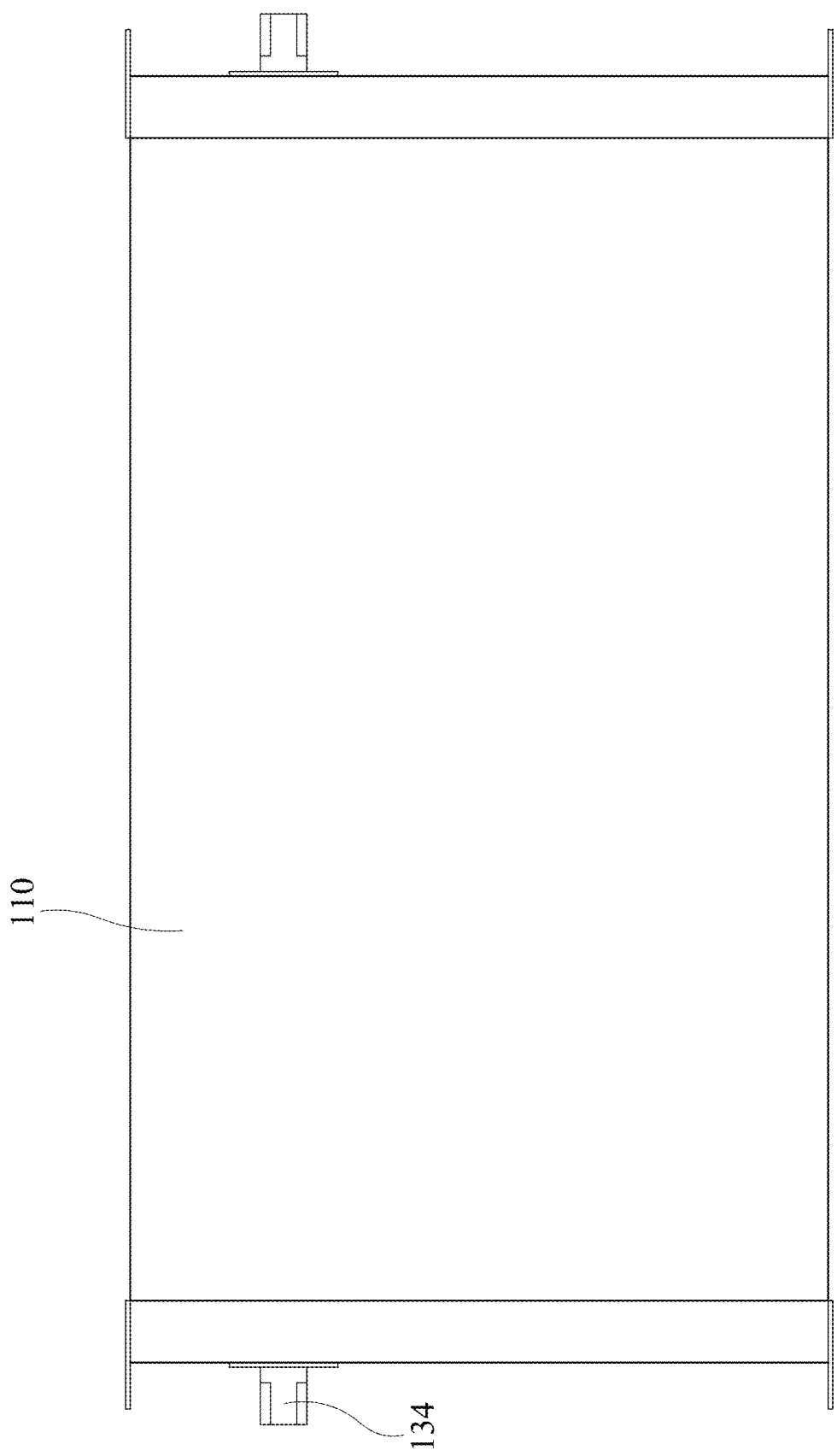
FIG. 11 is a bottom view of the exemplary embodiment of the automated data destruction system.
Figure 12:
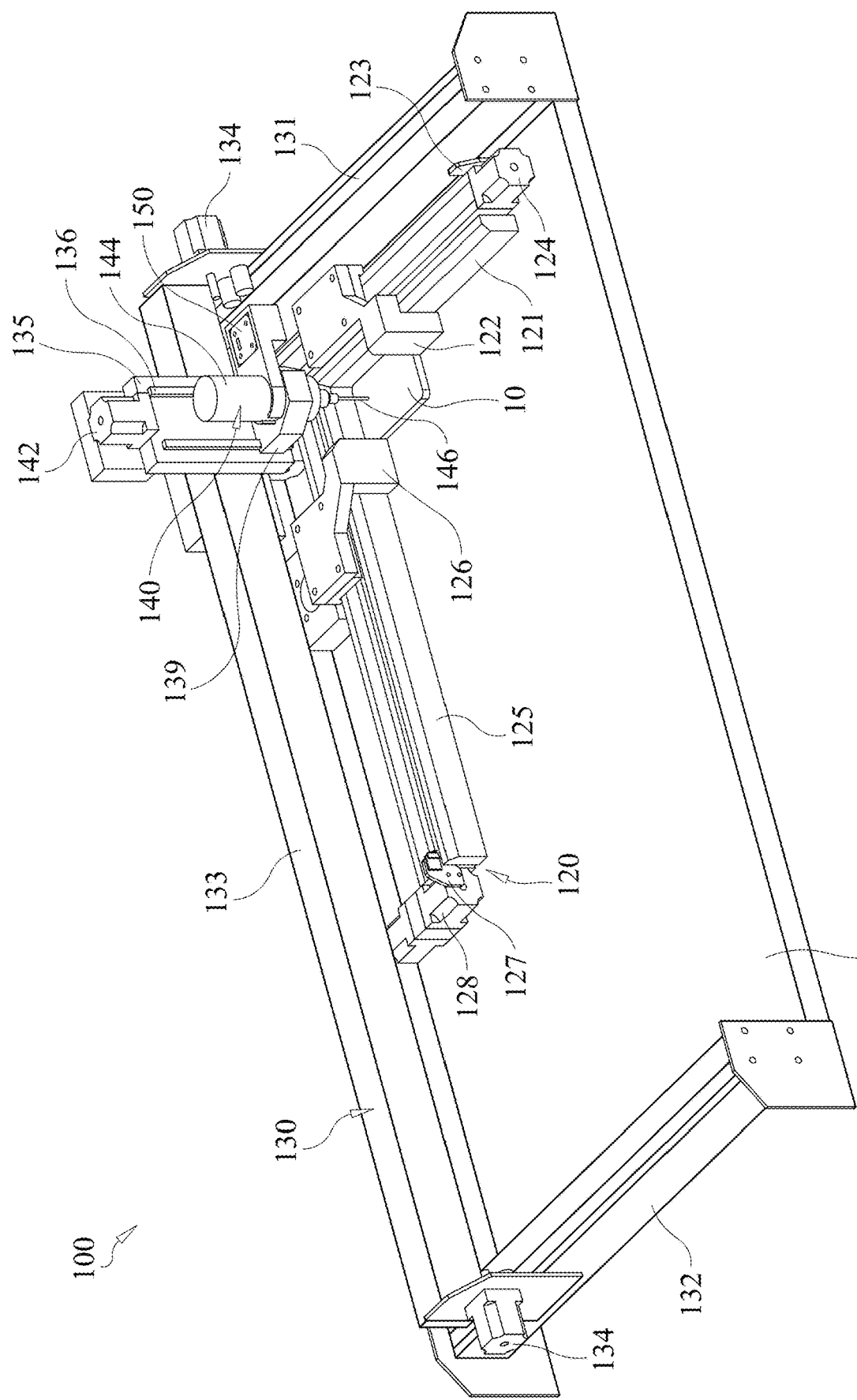
FIG. 12 is a second front, left, top view of the exemplary embodiment of the automated data destruction system.

Next, turning to FIGS. 3, 4 and in conjunction with FIG. 13, the controlling system 160 may be a separate device and further comprises at least one controller 161. The vision recognition system 150 and the controller 161 is in communication with the processor. Further, the controller 161 communicates with the securement mechanism 120, the positioning mechanism 130, and the drill 140. Based on the mobile communication device 10 identified by the vision recognition system 150 and the processor, the processor determines alignment of the securement mechanism 120, and movement of the positioning mechanism 130 and the drill 140.

Preferably, the processor uses artificial intelligence (AI) software and/or algorithms, and is connected to a database with a plurality of profiles. The profiles are established and calibrated by translating pixels into measurements, using gradient shift, and subtracting backgrounds from the images captured by the camera and the measurements may include the height, length, width, and shape of the mobile communication device 10, and in addition, the location, shape, size and dimensions of the at least one camera or flash of the mobile communication device 10. The profiles of each of the specific models of the mobile communication device 10 also includes the exact location and depth of the flash memory chip.

An exemplary method of using the apparatus is presented herein to further demonstrate the convenience and efficiency of the system. An exemplary user places the mobile communication device 10 on the platform 110, the vision recognition system 150 in communication with the processor identifies the model of the mobile communication device 10 based on the established profiles. Thereafter, according to the loaded profile, the securement mechanism 120 secures the mobile communication device 10, the positioning mechanism 130 locates the drill 140 to the corresponding pre-determined location, and the drill 140 precisely and accurately penetrates the mobile communication device 10 at the exact location and depth of the flash memory chip. Lastly, a photo may be captured by the camera and stored in a separate database for proof of destruction.

Figure 14:
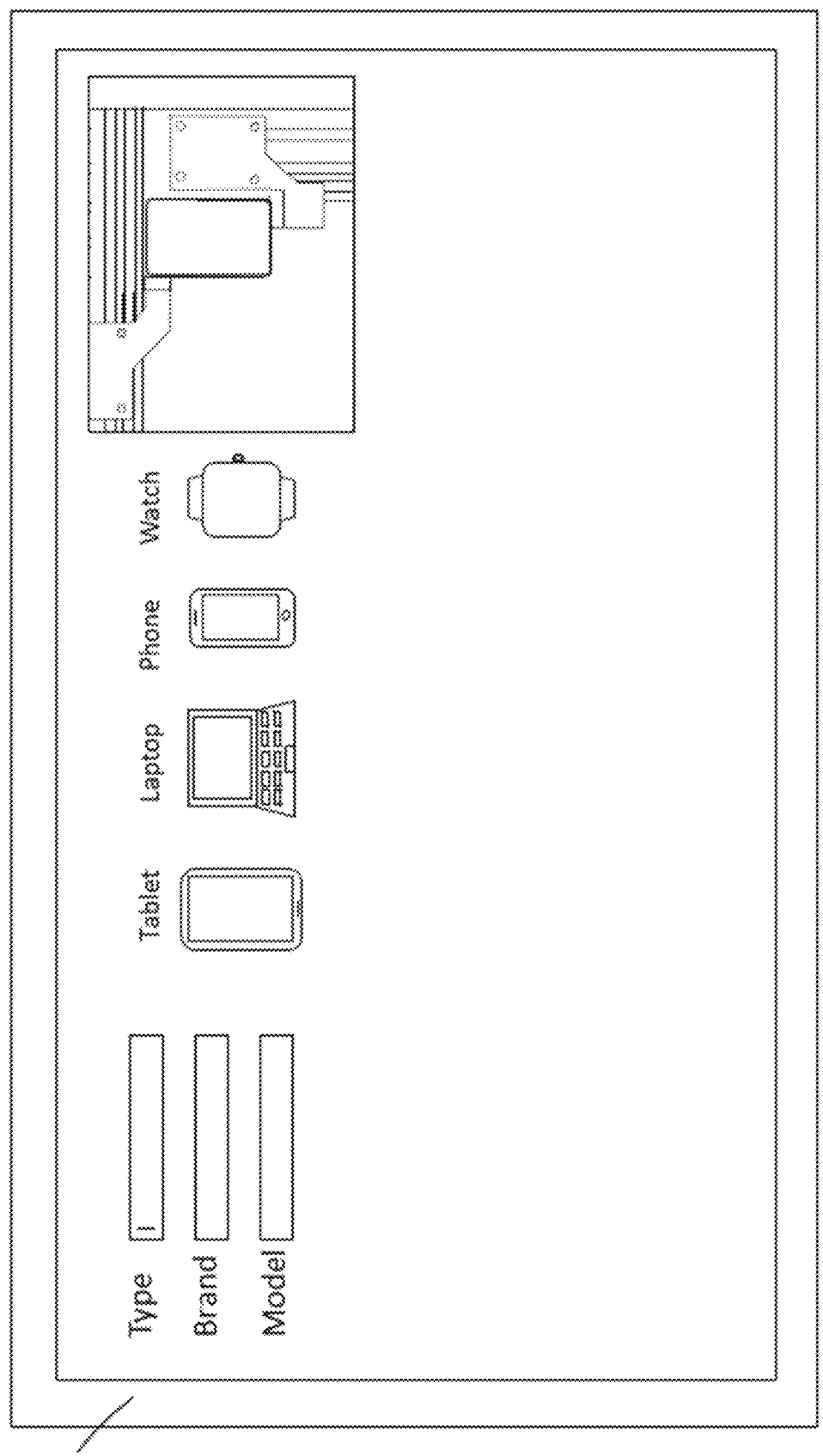
FIG. 14 depicts a user interface of the alternative exemplary embodiment.

Further, the controlling system 160 may further comprise a user interface 170, as illustrated in FIG. 14. In one aspect, the exemplary user can also choose the category of the mobile communication device 10 including tablets, laptops, phones or watches on the user interface 170, and type in the model of the mobile communication device 10. Then the vision recognition system 150 and the processor will confirm whether the mobile communication device 10 placed on the platform 110 is the model chosen to ensure that further action of the data destruction system 100 is accurate.

Figure 15:
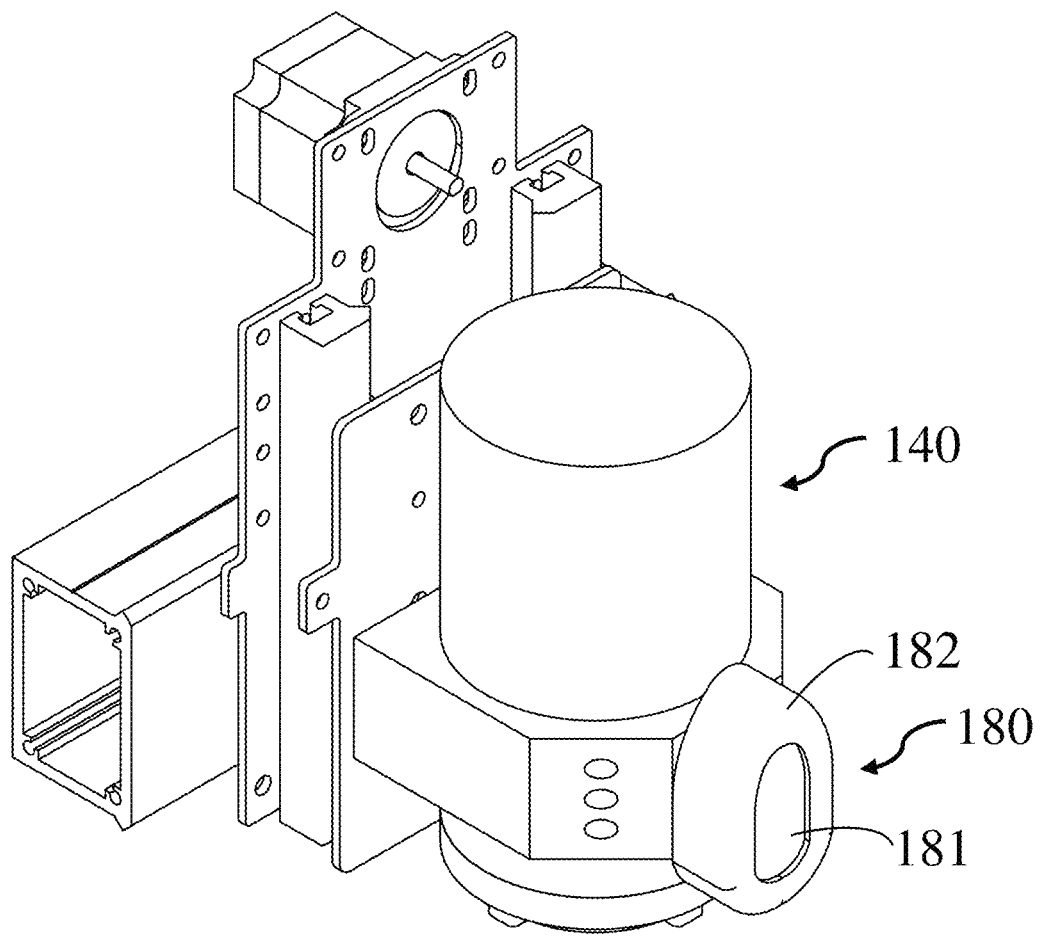
FIG. 15 depicts the automated data destruction system with a fire suppression system.
Figure 16:
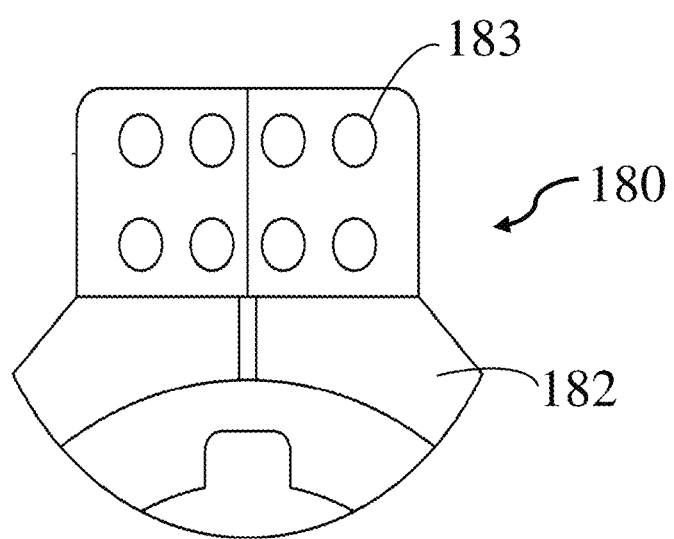
FIG. 16 depicts a bottom view of the fire suppression system.

As shown in FIGS. 15 and 16, an automatic fire suppression system 180 including a heat sensitive member 181, preferably a temperature sensitive glass, a propellant housing 182 receiving propellants, and a plurality of fire extinguishing nozzles 183 are added to the automated data destruction system 100. If a battery of the mobile communication device 10 is accidentally punctured and produces heat where the temperature reaches a threshold of the heat sensitive member 181, chemical reaction of the propellants will be initiated producing extinguishing gas which is then released from the fire extinguishing nozzles 183. The automatic fire suppression system 180 will be actuated to suppress a potential fire.

Figure 17:
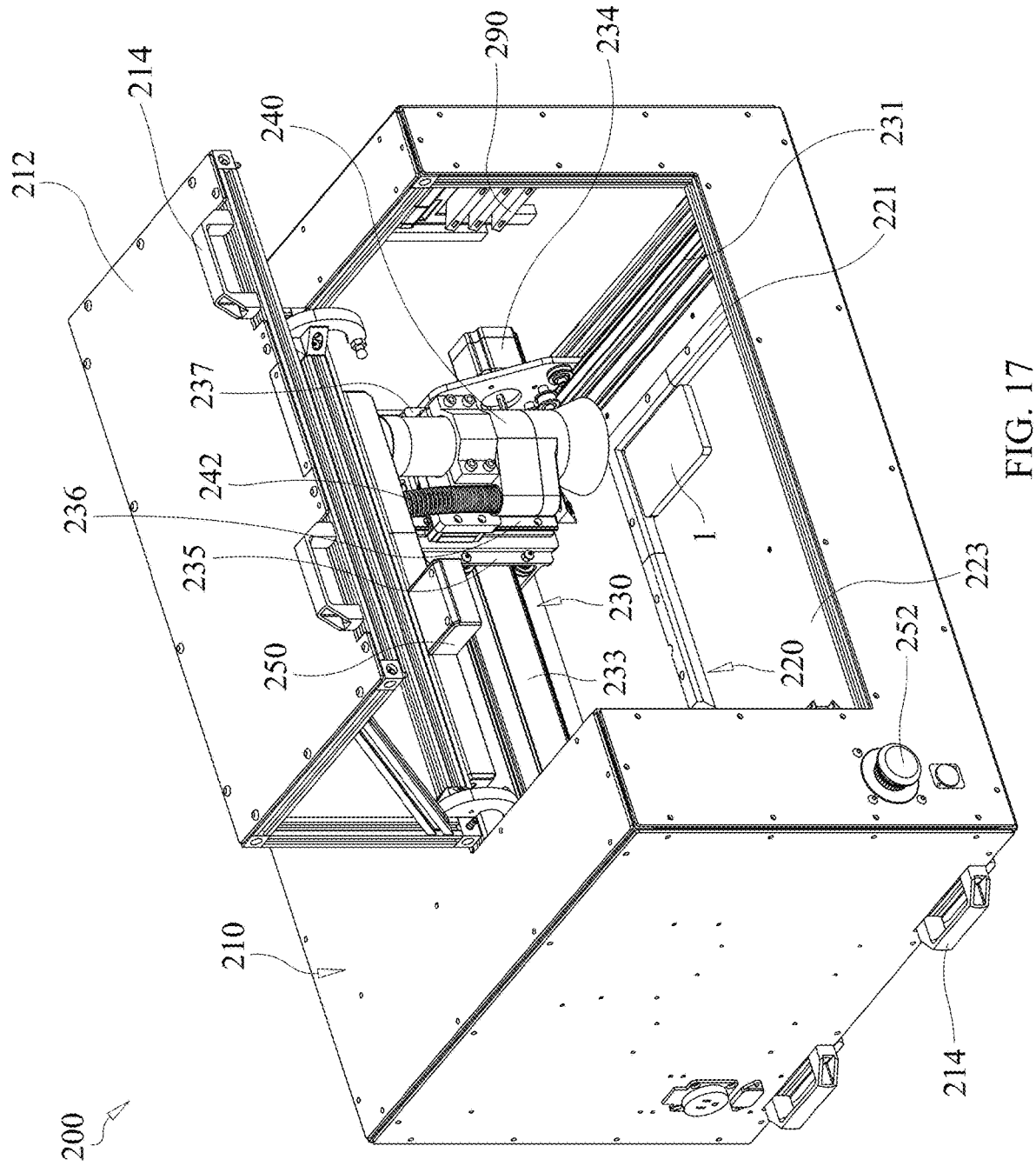
FIG. 17 is a perspective view of a second exemplary embodiment of the automated data destruction system.
Figure 18:
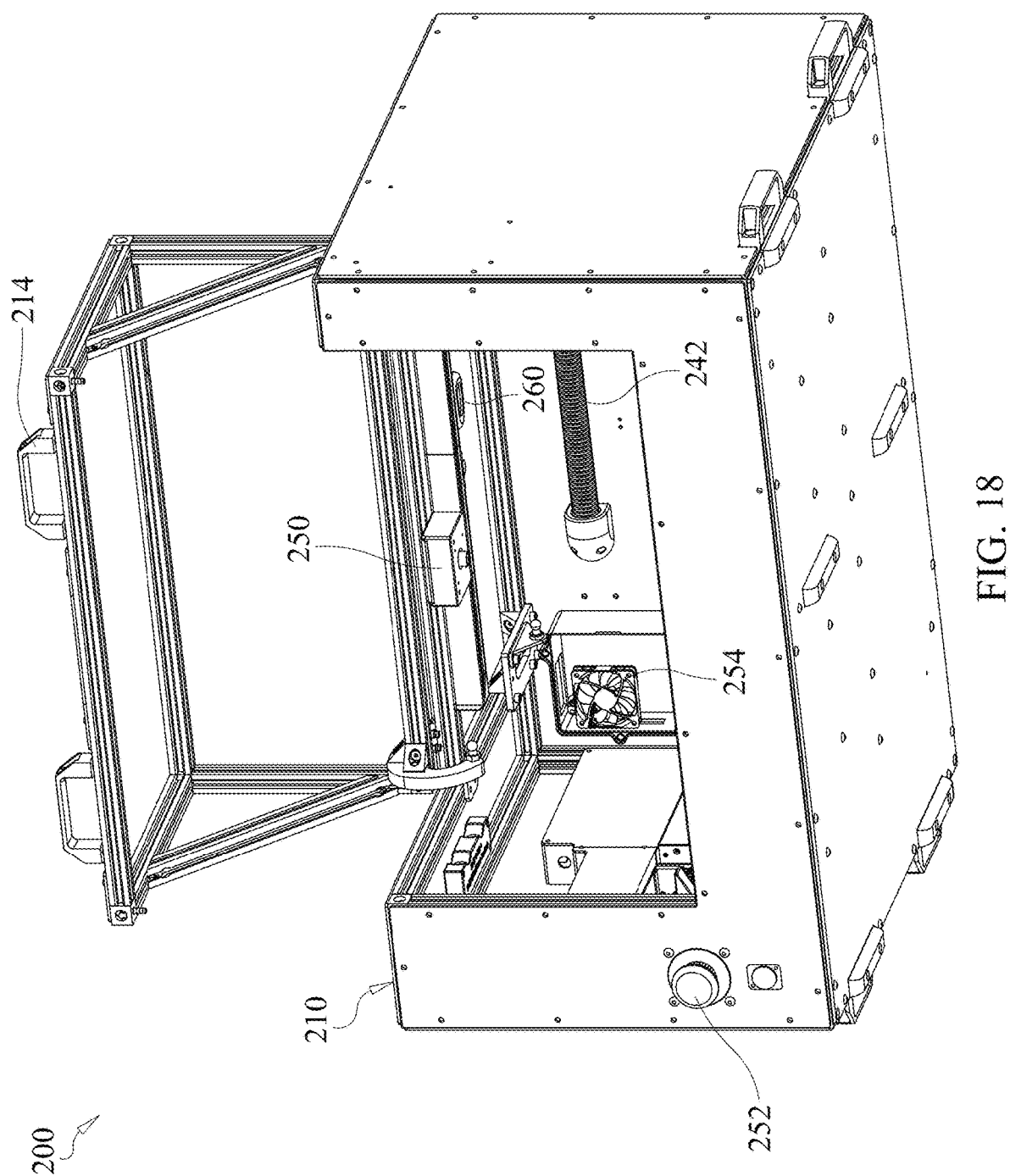
FIG. 18 is a second perspective view of the second exemplary embodiment of the automated data destruction system.
Figure 19:
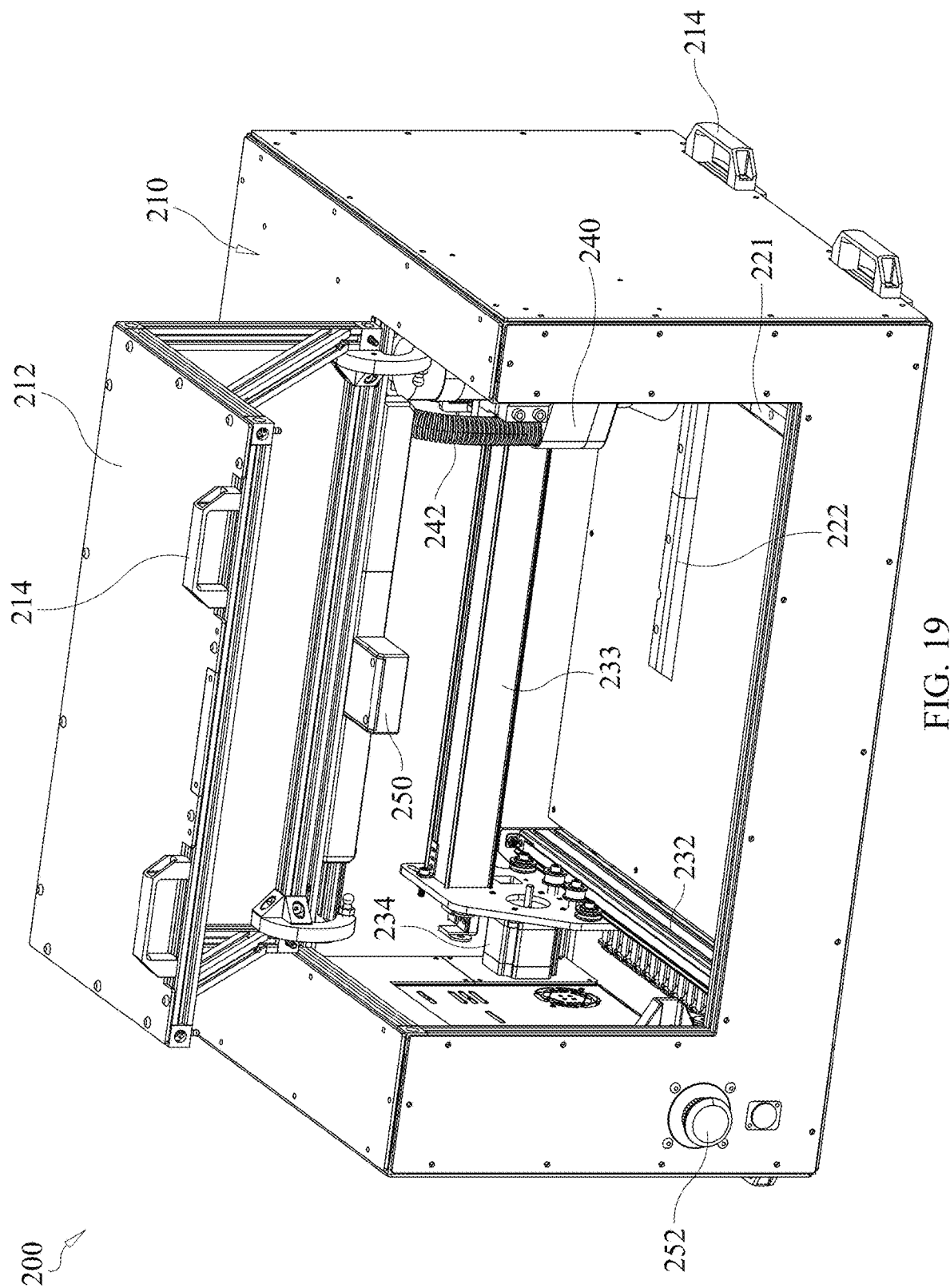
FIG. 19 is a third perspective view of the second exemplary embodiment of the automated data destruction system.

Turning to FIGS. 17 to 19, in a second embodiment, the automated destruction system 200 comprises a housing 210, accommodating the securement mechanism 220, the positioning mechanism 230, the drill 240, and the vision recognition system 250. The housing 210 may be formed by a variety of geometric configurations, but preferably a rectangular prism space and has a top side, a bottom side opposite from the top side, a front side coupled to the top side and the bottom side, a rear side opposite from the front side, and two lateral sides coupled to the top side, the bottom side, the front side and the rear side. The housing 210 comprises an opening which is preferable a hingedly connected tilt-up door 212, which provides access to an interior thereof. The tilt-up door 212 is defined by portions of the top side and the front side of the housing 210. Preferably, the tilt-up door 212 further comprises two panels perpendicular to each other and at least one handle 214. For safety purposes, it is anticipated that a momentary switch (not shown) in communication with the drill 240 is added to a frame of the tilt-up door 212, thereby the drill 240 can only be activated when the tilt-up door 212 is properly closed to prevent unintentional access to or tampering with the drill device. It is anticipated that alternative forms of doors and mechanisms to activate the drill 240 based on closure of doors can be used without departing from the spirit of the invention. For easy portability, additional handles 214 are added on the two lateral sides of the housing 210, as shown in FIGS. 17 and 18.

The securement mechanism 220 is disposed within the interior of the housing 210 and comprises a first track 221 positioned on the bottom side of the housing 210 in the direction of the X-axis and a second track 222 positioned on the bottom side of the housing 210 in the direction of the Y-axis. The mobile communication device 100 may be retained at a joining portion of the first and second tracks 221, 222, and a slip resistant pad 223 is positioned between the bottom side of the housing 210 and the securement mechanism 220. The slip resistant pad 223 provides additional friction to the mobile communication device 10 and facilitates retainment of the mobile communication device 10. Preferably, the slip resistant pad is constructed of slip resistant material including but not limited to silicon, rubber, PVC, gels, and foams.

The positioning mechanism 230, as shown in FIGS. 17 and 19, comprises a first rail 231 positioned along a first end of the bottom side in the direction of an X-axis, and a second rail 232 disposed along a second end of the bottom side, parallel and opposite from the first end. Similar to the first embodiment, a beam 233 having a first edge and a second edge positioned in the direction of the Y-axis is mounted on the first rail and the second rail 231, 232. A tower 235 is mounted on the beam 233 and configured to move along the beam in the direction of the Y-axis. The tower includes at least one guide bar 236 in the direction of a Z-axis orthogonal to the X-axis and the Y-axis, and a movable carriage 237 with a drill 240 mounted on the guide bar 236 configured to move along the guide bar 236. In the second embodiment, the drill 240 comprises a guard having a truncated cone configuration enclosing a drill bit of the drill 240 and forming an enclosed space to minimize dispersion of particles during the drilling process. In addition, a vacuum hose 242 is connected to the drill 240 and passes the generated particles to a collection attachment outside the housing 210.

Further, the vision recognition system 250 and the fire suppression system 180 may be disposed on the top side of the housing 210, and the automated data destruction system 200 may further comprise a cooling fan 254 to dissipate heat. Calibration tools 290 such as calibration blocks used to calibrate the drill bit is also provided. Furthermore, an emergency override system is also added, so the exemplary user can terminate actions of the automated data destruction system 100 by pressing the emergency button 252 in case of any contingency.

While the embodiments of the invention have been disclosed, certain modifications may be made by those skilled in the art to modify the invention without departing from the spirit of the invention.

The invention claimed is:

1. An automated data destruction system comprising:
    (a) a platform having a first end and a second end, where the second end is disposed opposite from the first end;
    (b) a securement mechanism, including:
        a first track disposed on the platform and extending in a direction of an X-axis;
        a second track coupled to the first track on the platform and extending in a direction of a Y-axis perpendicular to the X-axis;
        wherein the first track, the second track, and the platform define a securement space configured to retain an associated mobile communication device;
    (c) a positioning mechanism comprising:
        a first rail disposed along the first end of the platform,
        a second rail disposed along the second end of the platform,
        a beam having a first edge and a second edge extending in the direction of the Y-axis; wherein each of the first edge and the second edge of the beam is mounted on the first rail and the second rail respectively; and wherein the beam is configured to move in the direction of the X-axis;
        a tower mounted on the beam configured to move along the beam in the direction of the Y-axis; wherein the tower includes at least one guide bar extending in a direction of a Z-axis, which extends orthogonal to each of the X-axis and the Y-axis; and
        a movable carriage mounted on the guide bar, configured to move along the guide bar;
    (d) a drill coupled to the carriage;
    (e) a camera; and (f) a processor in communication with the camera, the positioning mechanism, and the drill;
wherein the camera and the processor are configured to determine edges of the associated mobile communication device and configurations of at least one camera of the associated mobile communication device by:
receiving images of the associated mobile communication device captured by the camera;
establishing a profile of the associated mobile communication device from the images, the profile comprising measurements of the associated mobile communication device, and the profile further comprising a location and a depth of a flash memory chip within the associated mobile communication device; and
determining an alignment of the positioning mechanism and the drill based on the established profile of the mobile communication device.

2. The automated data destruction system of claim 1,
wherein the securement mechanism is in communication with the processor and further comprises a movable first clamp mounted on the first track configured to move along the first track; and a movable second clamp mounted on the second track configured to move along the second track; and
wherein a distance between the first track and the second clamp, and a distance between the second track and the first clamp and a top surface of the platform form the securement space configured to secure the associated mobile communication device.

3. The automated data destruction system of claim 2,
wherein the securement mechanism includes a first motor and a second motor configured to drive the first and second clamps, respectively.

4. The automated data destruction system of claim 1, further comprising:
a fire suppression system positioned on the drill.

5. The automated data destruction system of claim 4,
wherein the fire suppression system comprises a heat sensitive member with a predetermined threshold, a propellant housing receiving propellants, and a plurality of fire extinguishing nozzles.

6. The automated data destruction system of claim 1, further comprising:
a first limit switch coupled to the first track configured to ensure a position of a first clamp; and
a second limit switch coupled to a second track configured to ensure a position of a second clamp.

7. The automated data destruction system of claim 1,
wherein the plurality of profiles are established and calibrated by translating pixels into the measurements of the associated mobile communication device, using gradient shift, and subtracting backgrounds from the images captured by the camera.

8. The automated data destruction system of claim 1,
wherein the measurements comprise measurements of the at least one camera of the associated mobile communication device.

* * * * *